United States Patent [19]

Hoffmann

[11] 4,451,207

[45] May 29, 1984

[54] TURBINE ROTOR FOR A FLOW METER

[75] Inventor: Helmuth Hoffmann, Bergisch-Gladbach, Fed. Rep. of Germany

[73] Assignee: Hydrotechnik GmbH, Limburg, Fed. Rep. of Germany

[21] Appl. No.: 364,530

[22] Filed: Apr. 1, 1982

[30] Foreign Application Priority Data

Apr. 1, 1981 [DE] Fed. Rep. of Germany ....... 3112959

[51] Int. Cl.³ .............................................. F03B 13/00
[52] U.S. Cl. ............................ 416/237 R; 416/193 A; 416/223; 416/231 R; 73/272 R; 73/861.89; 415/181
[58] Field of Search ................... 416/193 A, 237, 223, 416/231 A, 231 R, 234; 73/272 R, 861.89; 415/DIG. 1, 181

[56] References Cited

U.S. PATENT DOCUMENTS

| 84,614 | 12/1868 | Clough | 416/237 B |
|---|---|---|---|
| 1,209,700 | 12/1916 | Hanks | 73/861.89 |
| 4,141,674 | 2/1979 | Schönwald | 416/223 A |
| 4,199,296 | 4/1980 | De Chair | 415/181 |

Primary Examiner—Stephen Marcus
Assistant Examiner—John Kwon
Attorney, Agent, or Firm—Schwartz, Jeffery, Schwaab, Mack, Blumenthal & Koch

[57] ABSTRACT

A turbine rotor for a flow meter comprises a cylindrical rotor disk having a rotor axis, a plurality of rotor vanes extending radially from the rotor disk and a flat surface between the bases of each of the vanes. This construction permits the efficient start-up of the turbine rotor at flows of low viscosity.

7 Claims, 4 Drawing Figures

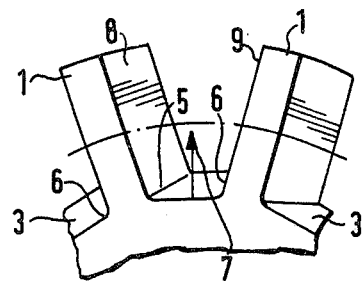
FIG. 2
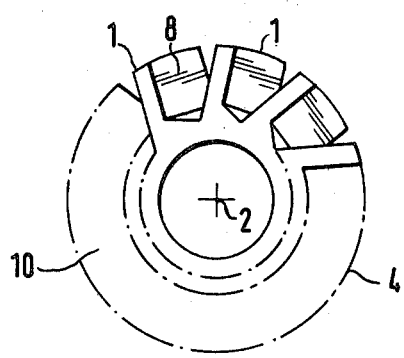
FIG. 3
FIG. 4
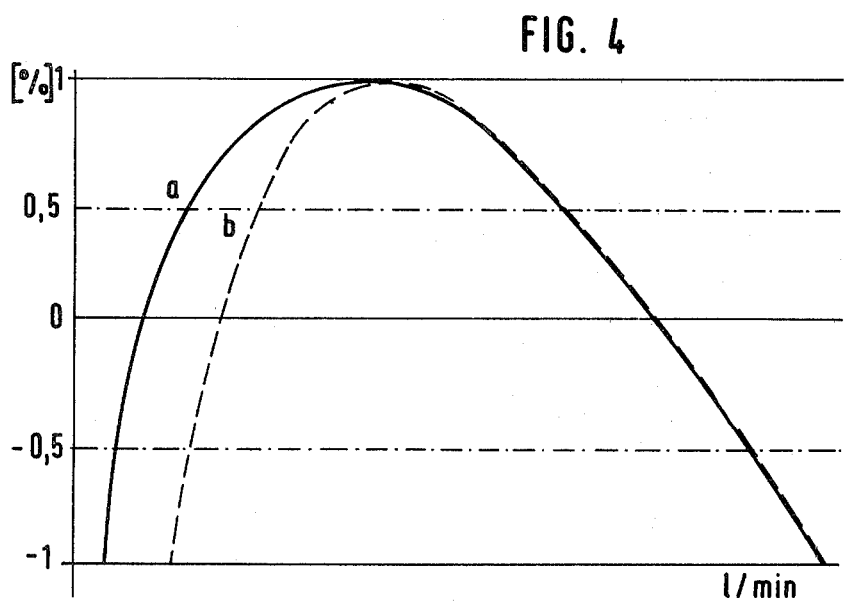

TURBINE ROTOR FOR A FLOW METER

BACKGROUND OF THE INVENTION

1. Field of the Invention

The invention concerns a turbine rotor for a flow meter wherein the turbine rotor is arranged in a flow channel of the measuring housing. The turbine rotor has specially designed blades and intermediate plates and is positioned such that its axis is in the direction of the flow. The flow meter is also equipped with an inductive pulse pickup.

2. Background of the Prior Art

Flow meters of this type are known per se and belong to the group of the intermediate volume counters operating on the principle of the so-called Woltmann impeller wheel counter and being particularly suitable for the accurate measurement of the instantaneous volume flow of fluids. A tukrbine rotor with a low mass centeringly located in a tubular body is exposed to flow in the axial direction with the medium to be measured impacting the turbine disk in the form of a quasi laminar flow after having been quieted by means of flow rectifiers. The rpm of the turbine disk is proportional to the mean flow velocity and thus corresponds over a broad range to the volume passing through.

The rpm of the turbine disk is preferably taken off with a low reaction force through the non-magnetic tubular body by means of an inductive transducer. The number of pulses per unit time is proportional to the instantaneous volume flow, while even in the case of the minimum volume flow, the rpm of the turbine disk is not affected by the inductive pulse takeoff. However, hydraulic losses are dependent on viscosity and are functions of the Reynolds number, respectively.

By selecting high quality, low friction bearing materials and by reducing the impeller mass, efforts have been made to keep the braking torque as low as possible in order to preserve a maximum effect, i.e., a broad measuring range of the counter or expansion of the measuring range. This affects the characteristic of the error curve. Such measures, however, largely depend on the angle of the blades to the axis of the turbine disk and on the number of blades, whereby the circumferential velocity of the impeller wheel is also affected.

Attempts to make the known turbine flow meters into an accurately operating measuring instrument have led over the course of time to improvements concerning the configuration of the impellers.

There are known configurations with two different slopes, for example, wherein a steeper slope is used in the forward part of the disk than in the rear part. This results in the fact that in the case of small flow volumes, rpm ranges are attained whereby the lower limit of the measuring range may be lowered. In order, however, to avoid reaching excessively high rpm ranges leading to increased wear, the rear part of the impeller disk is given with a less steep slope, thereby providing for the necessary equalization of velocity.

The design of an impeller wheel with two different slopes is very expensive to manufacture with the further disadvantage that an impeller wheel of this type is not suitable for extremely broad measuring ranges.

A further known configuration of Woltmann wheels is based on a design wherein six vanes have full diameters, while another six vanes are shorter, i.e. having approximately one-half of their height. Such a configuration is known as the so-called "stepped wheel". The vanes therein are flat. By means of the intermediate vanes, the formation of boundary layers on the vanes may be enhanced in the case of low flow rates. Vanes on the outside are thereby stressed higher which renders the counter more sensitive. The lower limit of the measuring range can thus be reduced.

Such a measure is again expensive in view of the manufacturing costs of the rotor disk.

SUMMARY OF THE INVENTION

The present invention is based on the discovery that the coefficient of sliding friction is always less than the coefficient of static friction in turbines. This relationship may be taken into consideration with respect to the startup behavior of the turbine rotors. In other words, a body set into motion by impact or a force acting in the form of a pulse will require the introduction of a lesser force than a body exposed to a continuously increasing force.

It is an object of the invention, therefore, to provide a configuration of a turbine rotor whereby the static friction of a stationary rotor is overcome at a very low velocity of the medium in order to expand the measuring range in the direction of small flows. In addition to other effects, forces appearing in the form of pulses are especially suitable for the purpose. Pulses may may be generated in keeping with the invention so that corresponding effects are obtained on the stationary rotor.

This and other objects of the invention are attained by constructing the turbine rotor of a flow meter having an induction pulse pickup such that the bottom curves of the rotor disk between the vanes are flat and form straight bottom lines that are parallel to each other and with the adjacent vane surfaces. As the result of this construction, the edges of the bottom surfaces on the upstream and downstream side are no longer joined flush with the inflow and outflow shapes, but triangular surfaces are created on the frontal sides of the rotor disk, when viewed in the axial direction of the latter, so that inflow and outflow edges are formed on the frontal surfaces of the rotor disk. Vortices are generated in an irregular sequence on the outflow edges, transferring pulse-like forces to the rotor disk sufficient to overcome the static friction of the stationary rotor disk. In cooperation with the inclination of the vanes, a force component in generated in the case of their exposure to flow in the direction of the circumference of the rotor disk, thereby exerting a rotating force. Together with the forces appearing in the form of pulses, the static friction of the rotor disk is overcome even with very low flow velocities so that the measuring range is expanded in the direction of the flows.

In a further embodiment of the invention, the surface normals located at an identical distance from a frontal surface of the rotor disk and standing on the centerlines extending in the flow direction of the bottom surfaces intersect at one point of the rotor axis of the rotor disk.

By means of this measure, the effective separation edges may be varied such that the effect desired may be adjusted.

It is advantageous to have the surface normals that pass through the center of gravity of all bottom surfaces intersect the axis of the rotor disk at a single point.

In this embodiment, the separation edges on the two frontal sides of the rotor disk are of equal size.

The frontal surfaces of the rotor disk are preferably flat which is advantageous not only in view of the vortex formation desired, but also for the manufacture of the rotor disk.

The bottom lines includes an angle of inclination β with the rotor axis of 20° to 30°. In a particularly advantageous embodiment of the invention, the angle of inclination β is 25°. By means of this measure, adequate forces are generated even in the case of extremely low flow velocities of the medium to be applied immediately following the overcoming of the static friction in order to effect a rotating motion.

BRIEF DESCRIPTION OF THE DRAWINGS

The invention will become more apparent with the aid of figures representing the embodiments. In the drawings:

FIG. 2 illustrates a sector shaped segment of a rotor disk in an enlarged representation;

FIG. 3 represents a rotor disk with the vanes shown in part only, and

FIG. 4 illustrates the characteristic error curve according to the present invention compared with the error curve of a corresponding measuring instrument according to the state of the art.

FIG. 1 shows a measuring turbine in a longitudinal section approximately in its actual size. The measuring housing 14 surrounds a round flow channel 15 and is equipped on the input side with an inlet 16 and on the discharge side with an outlet 17, and discharge connector.

Figure 1:
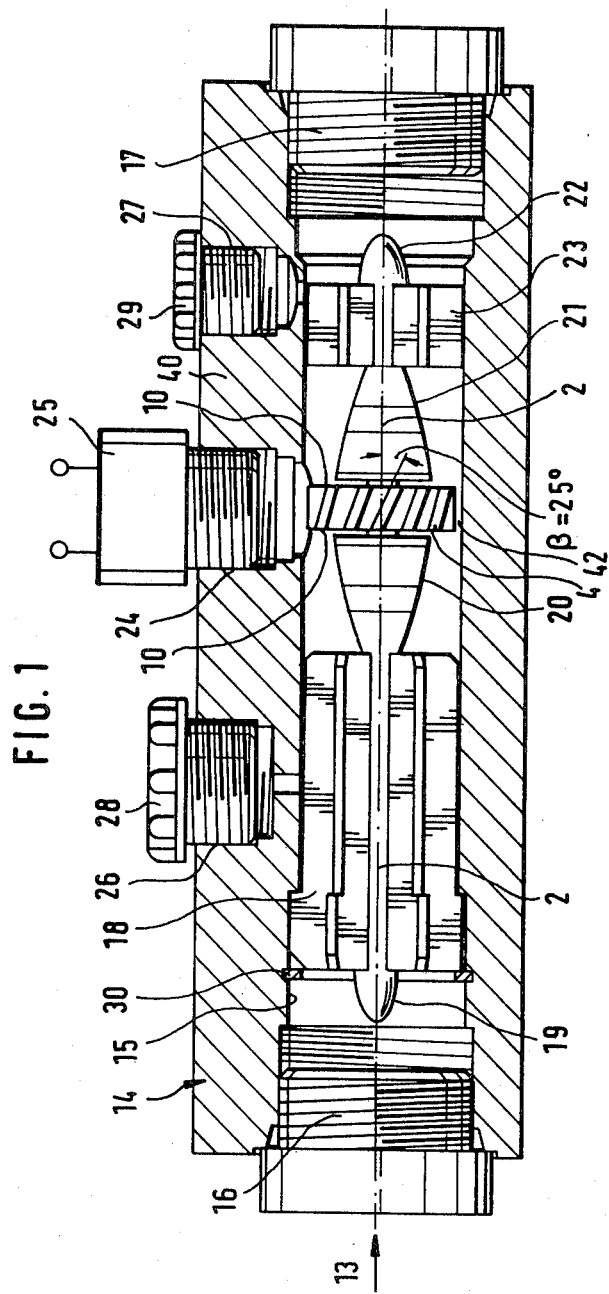
FIG. 1 shows a longitudinal section through a flow meter of the measuring turbine type.

The inlet and outlet connectors are both equipped with threads. The arrow 13 indicates the direction of flow of the flow medium to be measured. Immediately following the inlet connection, a flow rectifier 18 is located in the flow channel 15. The flow rectifier comprises six baffle plates in the embodiment exemplified. Each baffle plate is fastened to a ring 30 on the inlet side and simultaneously serves as the holder for the rotor axle 2. In order to reduce the formation of vortices, a flow form 19 precedes the rotor axle 2. Further flow forms 20, 21 and 22 are located in front and after the rotor disk 4 and at the outlet end of the axle 2. The flow form 20 has a configuration, such that the fluid flowing against the rotor disk is directed into the range of the rotor blades. The flow form 21 is followed immediately by a further baffle arrangement 23, also serving to rectify the flow.

Bore holes 26 and 27 are present in the housing 14 to receive suitable pressure and temperature transducers. These holes may be closed off by means of the caps 28 and 29. The openings of the transducer bores are located in the inlet area of the flow rectifiers 18 and 23 so that they have no appreciable effect on the turbine rotor 4.

The housing wall 14 of the flow channel 15 has a bore 24, arranged opposite the turbine rotor 4. An inductive measuring detector 25 (also referred to as an inductive pulse pickup) is located in the bore 24. The depth of insertion of inductive measuring detector 25 is variable.

FIG. 2 shows a sector shaped segment of a rotor disk 4 through its center wherein the bottom surfaces 3 located between the vanes 1 are flat. The bottom surfaces form straight bottom lines 5 and 6 parallel to each other with the adjacent vane surfaces 8 and 9.

The surface normals 7 passing through the center of gravity of all of the bottom surfaces 3 intersect the axis 2 of the rotor disk 4 at a single point. The frontal surfaces 10 of the rotor disk 4 are flat as may be seen clearly in FIG. 1. Similarly, the angle of inclination β included between the axis 2 of the rotor disk 4 and the bottom lines 5 and 6 of the vane surfaces may be seen in FIG. 1.

FIG. 4 shows the characteristic error curve (solid line) compared with the corresponding error curve of a flow meter according to the state of the art (broken line).

As clearly shown by the configuration of the curve, the measuring curve begins for example at an error of −1% with a flow volume of 18 liter per minute. This actual measured value reflects one embodiment of the invention. The curve rises very steeply and attains its maximum with only a slight increase of the flow volume to a point equal the value also obtained with the forms of embodiment of rotor disks according to the state of the art.

As is readily seen by the application of the measure according to the invention, the initial point of use of the flow meter may be shifted toward lower flow volumes so that a significant expansion of the measuring range is obtained.

A further advantage of the present invention consists of the simplified manufacturing of the rotor disks as milling may be effected with a single setting of the milling tool. This saves a series of further work steps, resulting in an appreciable reduction of overall costs.

The specification and drawings set forth preferred embodiments of the invention. It should be noted, however, that the invention is not limited to those specific embodiments and methods specifically disclosed, but extend instead to all embodiments, substitute and equivalent constructions falling within the scope of the invention as defined by the claims.

What is claimed is:

1. A turbine rotor for flow meter comprising a cylindrical rotor disk having a rotor axis, a plurality of rotor vanes extending radially from said cylindrical rotor disk, at an angle of inclination β with said rotor axis, a flat surface between each of said rotor vanes wherein each flat surface abuts a vane on each side forming lines of abutment, said lines of abutment being parallel.

2. The turbine rotor of claim 1, wherein said rotor vanes are flat plates.

3. The turbine rotor of claim 1, wherein the line normal to each flat surface located at an equal distance from a frontal surface of said rotor disk and extending from the central point of said flat surface intersect at the same point along said rotor axis.

4. The turbine rotor of claim 1, wherein line normals pass through the center of gravity of said flat plates and intersect at the same point along said rotor axis.

5. The turbine rotor of claim 3, wherein said frontal surfaces are flat.

6. The turbine rotor of claim 1, wherein said angle of inclination β is between about 20° and 30°.

7. The turbine rotor of claim 6, wherein β is 25°.

* * * * *